(12) United States Patent
Wang et al.

(10) Patent No.: US 12,493,982 B2
(45) Date of Patent: Dec. 9, 2025

(54) POSITIONING METHOD, ELECTRONIC DEVICE, AND STORAGE MEDIUM

(71) Applicant: Lenovo (Beijing) Limited, Beijing (CN)

(72) Inventors: Heping Wang, Beijing (CN); Sen Lin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 379 days.

(21) Appl. No.: 18/122,573

(22) Filed: Mar. 16, 2023

(65) Prior Publication Data
US 2023/0360263 A1    Nov. 9, 2023

(30) Foreign Application Priority Data
May 5, 2022 (CN) .......................... 202210491857.2

(51) Int. Cl.
*G06T 7/73* (2017.01)
*G06V 10/764* (2022.01)

(52) U.S. Cl.
CPC .............. *G06T 7/74* (2017.01); *G06V 10/764* (2022.01); *G06T 2207/20021* (2013.01)

(58) Field of Classification Search
CPC ............ G06T 7/74; G06T 2207/20021; G06V 10/764
See application file for complete search history.

(56) References Cited

U.S. PATENT DOCUMENTS

| | | | | |
|---|---|---|---|---|
| 2010/0066843 | A1* | 3/2010 | Muramatsu | G01S 3/7865 348/208.14 |
| 2015/0098616 | A1* | 4/2015 | Gervautz | G06V 10/60 382/103 |
| 2017/0255648 | A1* | 9/2017 | Dube | G06V 10/40 |
| 2017/0345162 | A1* | 11/2017 | Bamba | G06T 7/248 |
| 2018/0276841 | A1* | 9/2018 | Krishnaswamy | G06V 10/25 |
| 2018/0330198 | A1* | 11/2018 | Harary | G06V 10/44 |

\* cited by examiner

*Primary Examiner* — Pinalben Patel
(74) *Attorney, Agent, or Firm* — ANOVA LAW GROUP, PLLC

(57) ABSTRACT

A positioning method includes obtaining a first image at a first position; obtaining first image information from the first image, matching the first image information with second image information in an information set to obtain target information corresponding to the first image, and obtaining position information of the first position based on one of a plurality of pieces of position information that corresponds to the target information. The first image includes an image captured at the first position. The first position is a position within a target area. The information set includes the plurality of pieces of position information of a plurality of positions within the target area and the second image information respectively corresponding to each of the plurality of pieces of position information. The second image information is obtained based on a second image that is captured from the plurality of positions respectively within the target area.

20 Claims, 7 Drawing Sheets

POSITIONING METHOD, ELECTRONIC DEVICE, AND STORAGE MEDIUM

CROSS-REFERENCE TO RELATED APPLICATION

The present application claims priority to Chinese Patent Application No. 202210491857.2, filed on May 5, 2022, the entire content of which is incorporated herein by reference.

TECHNICAL FIELD

The present disclosure relates to the field of image processing technology and, in particular, to a positioning method, device, and an electronic device.

BACKGROUND

Satellites are often used for positioning. However, there are situations where the satellite signal is poor, and an object cannot be positioned. Therefore, there is an urgent need for a technical solution that can achieve positioning without satellites.

SUMMARY

One aspect of the present disclosure provides a positioning method including obtaining a first image at a first position; obtaining first image information from the first image, matching the first image information with second image information in an information set to obtain target information corresponding to the first image, and obtaining position information of the first position based on one of a plurality of pieces of position information that corresponds to the target information. The first image includes an image captured at the first position. The first position is a position within a target area. The information set includes the plurality of pieces of position information of a plurality of positions within the target area and the second image information respectively corresponding to each of the plurality of pieces of position information. The second image information is obtained based on a second image. The second image is captured from the plurality of positions respectively within the target area.

Another aspect of the present disclosure provides a positioning device including an image obtaining member configured to obtain a first image at a first position, an information obtaining member configured to obtain first image information from the first image; an information matching member configured to match the first image information with second image information in an information set to obtain target information corresponding to the first image, and a position obtaining member configured to obtain position information of the first position based on one of the plurality of pieces of position information that corresponds to the target information. The first image includes an image captured at the first position. The first position is a position within a target area. The information set includes the plurality of pieces of position information of a plurality of positions within the target area and the second image information respectively corresponding to each of the plurality of pieces of position information. The second image information is obtained based on a second image. The second image is captured from the plurality of positions respectively within the target area.

Another aspect of the present disclosure provides an electronic device including an image acquisition device for shooting images, a memory storing a computer program, and a processor configured to execute the computer program to: obtain a first image at a first position, obtain first image information from the first image, match the first image information with second image information in an information set to obtain target information corresponding to the first image, and obtain position information of the first position based on one of the plurality of pieces of position information that corresponds to the target information. The first image includes an image captured at the first position. The first position is a position within a target area. The information set includes the plurality of pieces of position information of a plurality of positions within the target area and the second image information respectively corresponding to each of the plurality of pieces of position information. The second image information is obtained based on a second image. The second image is captured from the plurality of positions respectively within the target area.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
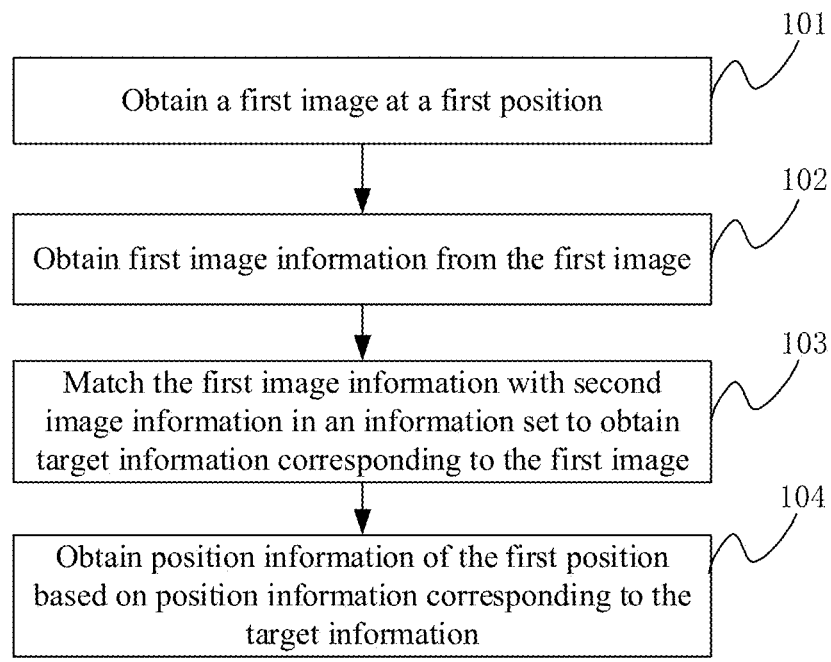
FIG. 1 is a schematic flow chart of a positioning method consistent with the embodiments of the disclosure.

FIG. 1 is a schematic flow chart of a positioning method consistent with the embodiments of the disclosure. The method is applicable to electronic devices capable of image processing, such as mobile phones and tablet computers. The technical solution is mainly used to improve the reliability of positioning the electronic devices. As shown in FIG. 1, the positioning method includes the following processes.

At process 101, a first image at a first position is obtained.

The first image is an image captured at a first position, and the first position is any position within the target area.

Figure 2:
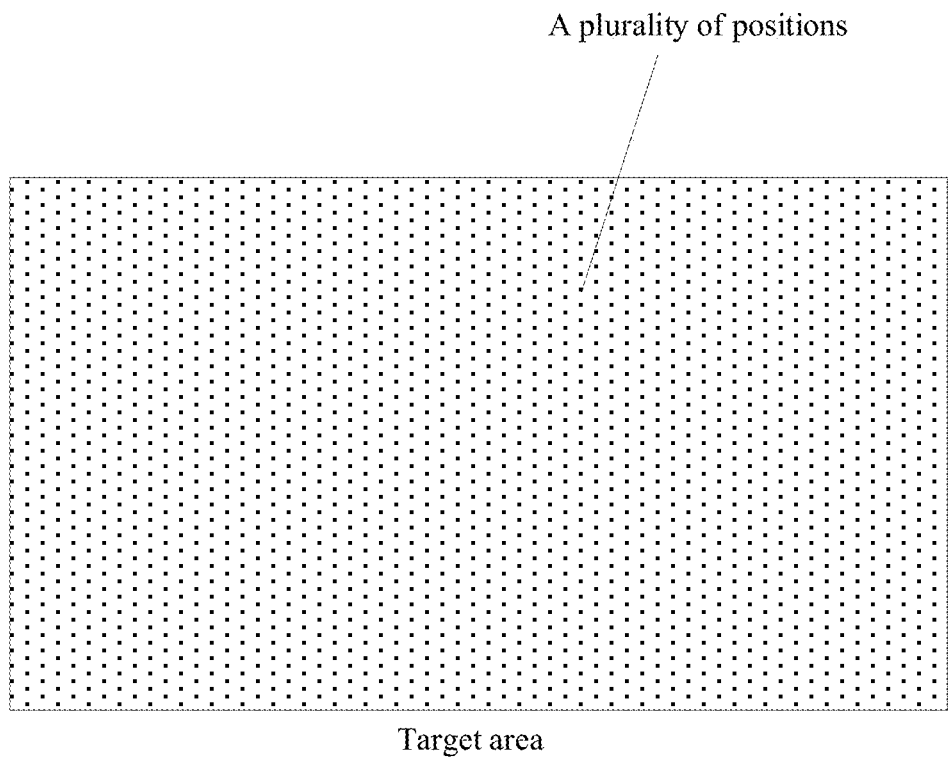
FIG. 2 is a schematic diagram of an example target area consistent with the embodiments of the disclosure.

FIG. 2 is a schematic diagram of an example target area consistent with the embodiments of the disclosure. As shown in FIG. 2, the target area may be an outdoor or indoor area, and the target area includes a plurality of positions. Each position within the target area corresponds to one piece of position information. The position information may include coordinate information of the corresponding position on a corresponding coordinate system, such as coordinate data relative to the earth coordinate system, to uniquely represent the position. Each piece of position information corresponds to a piece of second image information. The position information and the second image information are mapped one by one. The position information of a plurality of positions and the second image information respectively corresponding to each piece of position information form an information set.

The second image information corresponding to each piece of position information is obtained based on a second image. The second image is an image captured from the plurality of positions respectively within the target area. The second image is captured at each of the plurality of positions within the target area. Then the second image information corresponding to the corresponding position is obtained based on the second image. Thus, the position information of each position and the second image information obtained based on the second image captured at the position constitutes the information set corresponding to the target area.

At process 102, first image information is obtained from the first image.

The first image information that uniquely characterizes the first image can be obtained by performing image feature extraction and object recognition on the first image.

The first image information may be image information related to each image pixel in the first image, or the first image information may be image information related to a target object recognized in the first image. The target object refers to an object recognized in the first image, such as a building, a billboard, a tree, or a plant, etc.

At process 103, the first image information is matched with the second image information in the information set to obtain target information corresponding to the first image.

Specifically, the first image information can be compared with each piece of second image information in the information set in sequence, or the first image information can be compared with each piece of second image information in the information set at a same time, to find the piece of second image information that matches the first image information in the information set. The matched piece of second image information is target information corresponding to the first image. The target information corresponds to one piece of position information in the information set.

At process 104, according to the position information corresponding to the target information, the position information of the first position is obtained.

Specifically, the position information corresponding to the target information may be used as the position information of the first position, or the position information corresponding to the target information may be processed to obtain the position information of the first position.

In some embodiments, the information set is pre-configured for the plurality of positions in the target area, and the information set includes the position information of the plurality of positions in the target area and the second image information corresponding each of the plurality of positions.

After the first image at the first position to be positioned is obtained, the target information corresponding to the first image can be obtained by matching the first image information of the first image with the second image information in the information set, so that the position information of the first position can be obtained according to the position information corresponding to the target information in the information set. Therefore, the positioning is realized through the comparison of image information, rather than relying on satellite signal positioning, thereby avoiding the situation that the satellite signal is poor and cannot be positioned, and improving the reliability of positioning.

In some embodiments, the first image includes a plurality of first sub-images, and the first image information includes shooting direction information corresponding to each of the plurality of first sub-images. The first image includes the plurality of first sub-images obtained by shooting in a plurality of shooting directions, and each of the plurality of first sub-images corresponds to one of the plurality of shooting directions. Therefore, the first image information obtained from the first image at least includes the shooting direction information corresponding to the plurality of first sub-images.

Figure 3:
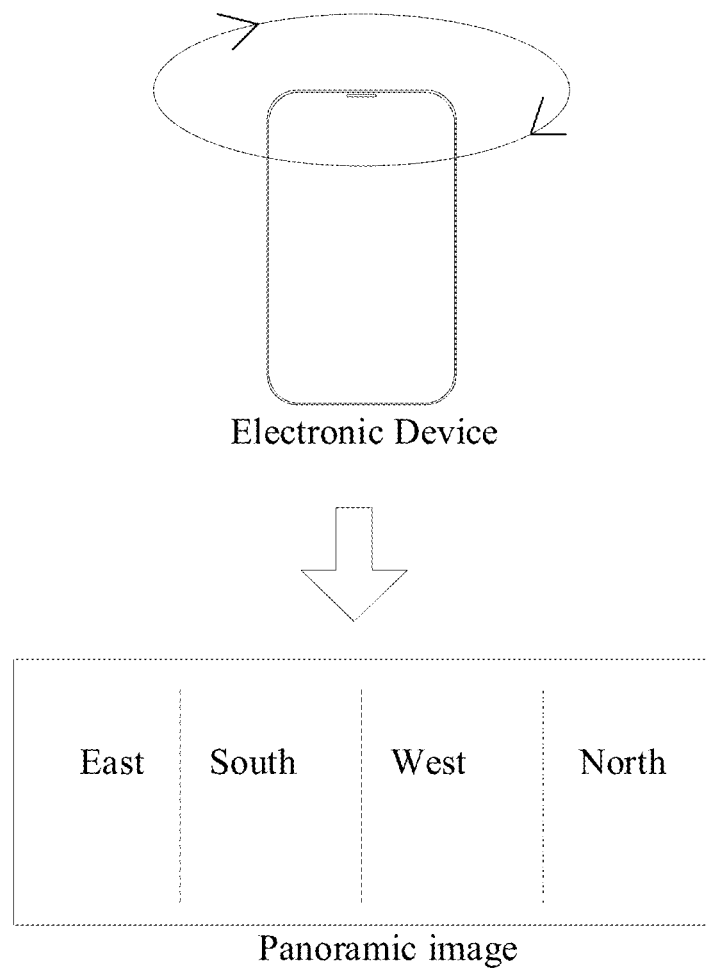
FIG. 3 is a schematic diagram of an example first image consistent with the embodiments of the disclosure.

FIG. 3 is a schematic diagram of an example first image consistent with the embodiments of the disclosure. As shown in FIG. 3, the first image is a panoramic image captured at a first position, and the first image includes a plurality of first sub-images in a plurality of shooting directions of east, west, north, and south captured with the first position as a reference. The first image information obtained from the first image at least includes information about the plurality of shooting directions of east, west, south, and north.

Based on the above, when matching the first image information with the second image information in the information set in process 103, the first image information may be matched with the second image information in the information set according to the shooting direction information. For example, according to different shooting direction information, the image information of the first sub-image corresponding to each different shooting direction information in the first image information is matched with the image information corresponding to each different shooting direction information in the second image information, so that the second image information matching the first image, that is, the target information is obtained.

In some embodiments, the second image includes a plurality of second sub-images, and the second image information includes shooting direction information corresponding to each of the plurality of second sub-images. The second image includes the plurality of second sub-images obtained by shooting in a plurality of shooting directions, and each of the plurality of second sub-images corresponds to one of the plurality of shooting directions. Therefore, the second image information obtained from the second image at least includes the shooting direction information corresponding to the plurality of second sub-images.

For example, the second image is a panorama image captured at a plurality of positions in the target area, and the second image includes a plurality of second sub-images in a plurality of shooting directions of east, west, north, south captured with the corresponding position in the target area as a reference. The second image information obtained from the second image at least includes information about the plurality of shooting directions of east, west, north, south.

Based on the above, when matching the first image information with the second image information in the information set according to the shooting direction information, specifically, according to the shooting direction information, the first sub-image in the first image and the second sub-image in the second image corresponding to the matched shooting direction information can be matched to obtain the target information corresponding to the first image.

Figure 4:
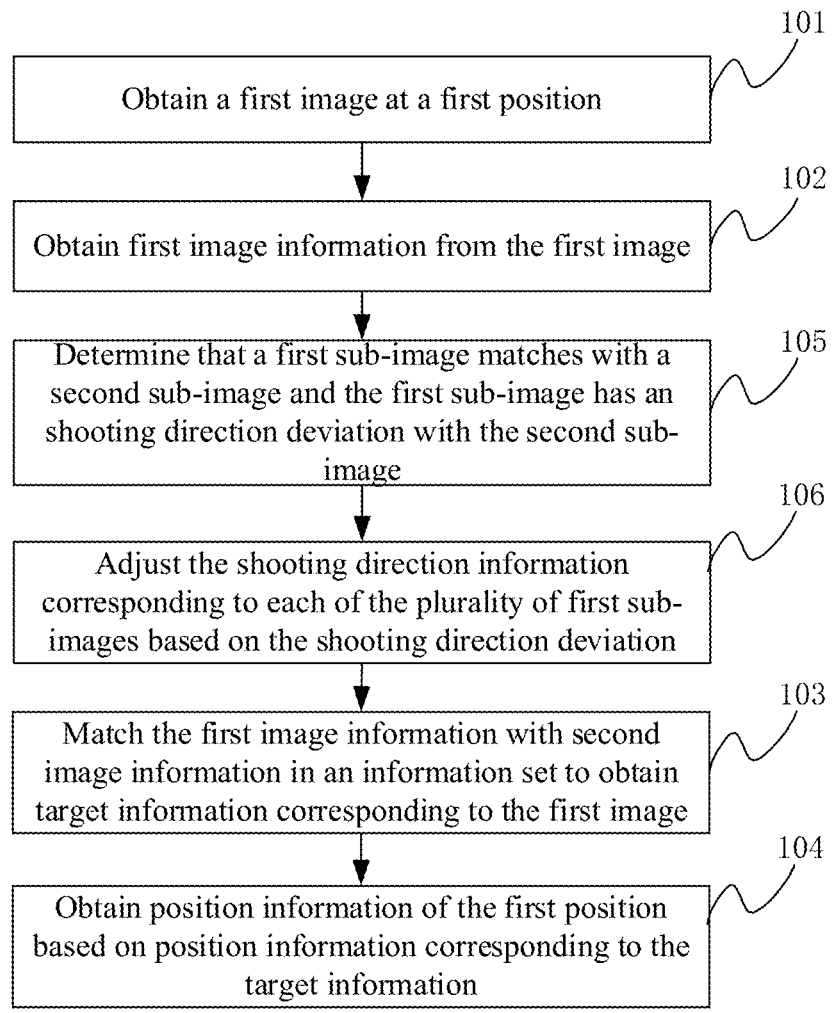
FIG. 4 is a schematic flow chart of the positioning method according to an example embodiment of the disclosure.

FIG. 4 is a schematic flow chart of the positioning method according to an example embodiment of the disclosure. As shown in FIG. 4, in some embodiments, before matching the first image information with the second image information in the information set according to the shooting direction information, the following processes may be performed first.

At process 105, it is determined that there is a first sub-image and a second sub-image that match but have deviations in shooting directions.

For example, the first image includes four first sub-images a1, a2, a3, a4, respectively corresponding to four shooting directions of east, south, west, and north. The second image includes four second sub-images b1, b2, b3, and b4, respectively corresponding to four shooting directions of south, west, north, and east. An image comparison is performed between the first sub-images in the first image and the second sub-images in the second image. Then it is determined a pair of matched first sub-image and the second sub-image, and determined a shooting direction deviation between the pair of matched first sub-image and the second sub-image according to the shooting direction of the first sub-image and the shooting direction of the second sub-image.

At process 106, the shooting direction information corresponding to each of the plurality of first sub-images is adjusted based on the shooting direction deviation.

For example, before matching the image information, the shooting direction information corresponding to the first sub-image of the pair of matched first sub-image and the second sub-image is adjusted according to the shooting direction deviation, so that the pair of matched first sub-image and the second sub-image have consistent shooting direction information.

Based on the above, when matching the first image information with the second image information in the information set according to the shooting direction information, the first sub-image and the second sub-image with the same shooting direction information are matched, to improve matching efficiency.

In some embodiments, when obtaining the first image information from the first image in process 102, information extraction may be performed on an entire image area of the first image, such as extracting feature vectors, extracting image key points, and extracting histogram statistics information, etc., to obtain the first image information. Based on this, in process 103, these extracted feature vectors, image key points, and histogram statistical information can be matched with the second image information of a corresponding type in the information set, to obtain the target information corresponding to the first image.

Figure 5:
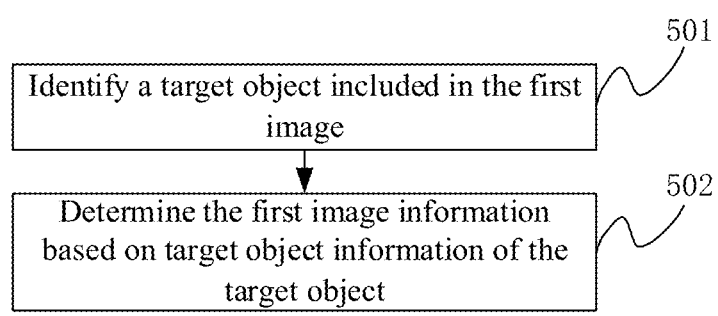
FIG. 5 is a schematic flow chart of a part of the positioning method according to an example embodiment of the disclosure.

FIG. 5 is a schematic flow chart of a part of the positioning method according to an example embodiment of the disclosure. As shown in FIG. 5, in some embodiments, when obtaining the first image information from the first image in process 102, the method further includes the following processes.

At process 501, at least one target object included in the first image is obtained.

In some embodiments, a preset recognition algorithm may be used to perform target object recognition on the first image, to recognize the target object in the first image, such as a building, a billboard, a tree, etc.

At process 502, the first image information is determined according to the target object information of the target object.

The target object information is used for matching the first image information with the second image information.

Specifically, the target object information may be information related to the target object. The first image information obtained according to the target object information can uniquely represent the first image through the target object included in the first image.

In some embodiments, the target object information is obtained by extracting the feature vector of an image area of the target object and extracting the coordinates of the target object in the first image. Based on this, after the first image information is obtained according to the feature vectors and coordinates, the first image information is matched with the second image information in the information set, to obtain the target information corresponding to the first image.

Figure 6:
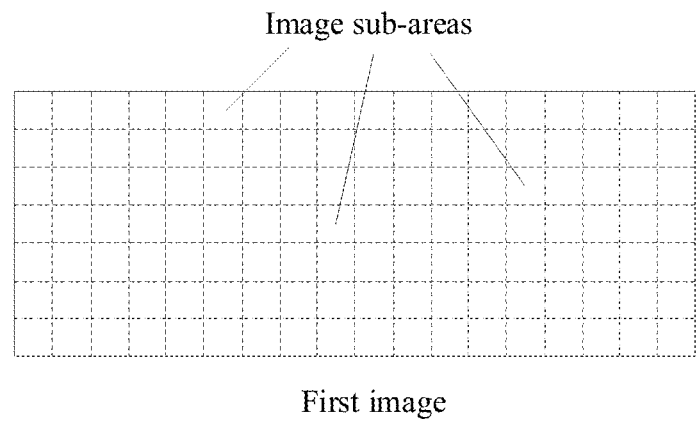
FIG. 6 is a schematic diagram showing a divided first image consistent with the embodiments of the disclosure.

In some embodiments, the image area of the first image includes a plurality of image sub-areas. The plurality of image sub-areas are obtained by dividing the image area of the first image. FIG. 6 is a schematic diagram showing a divided first image consistent with the embodiments of the disclosure. As shown in FIG. 6, a plurality of image sub-areas are obtained by dividing the image area of the first image according to rows and columns.

Based on the above, the target object identified in the first image and the image sub-area where the target object is located are encoded to obtain the target object information. The target object information may include an object code of the target object and a position code of the target object. The object code of the target object represents a type of the target object. The object code of the target object can uniquely represent the target object, such as representing a certain building, representing a certain billboard, etc. The position code of the target object represents the image sub-area where the target object is located in the first image. Thus, the first image information can be determined according to the object code and position code of the target object included in the first image.

Specifically, in some embodiments, the object code and position code of the target object included in the first image may be combined to obtain the first image information composed of the object code and the position code. For example, a plurality of target objects are identified in the first image. The object code and position code of each of the plurality of target object are combined. The combined object code and position code of the plurality of target objects are spliced again to obtain first image information.

In some embodiments, the second image information in the information set is obtained by combining the object code and position information of the target object included in the second image. For example, after the second image is captured at a plurality of positions in the target area, the target object included in the second image is identified. Then the target object included in the second image is encoded to obtain the object code and position code of the target object included in the second image, thereby obtaining the second image information corresponding to the second image. The second image information and the position information of the corresponding position in the target area constitute the information set.

In some embodiments, the first image information matches to the second image information in response to the first image information including the target object information with an object code and position code same as an object code and position code of the target object information included in the second image information. Specifically, the first image information includes the target object information with the object code and position code same as the object code and position code of the target object information in the second image information.

Figure 7A:
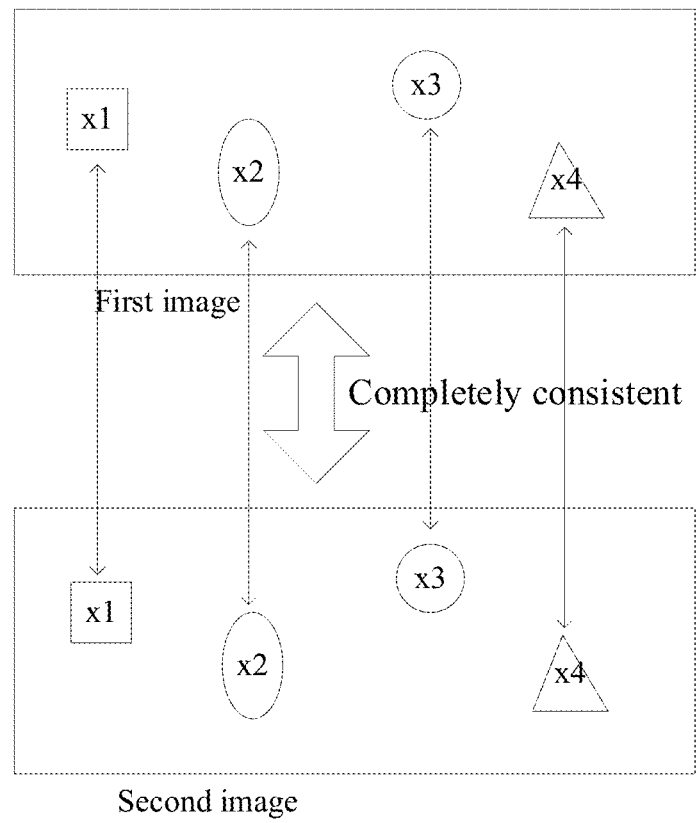
FIGS. 7A and 7B are schematic diagram of matching a first image with a second image consistent with the embodiments of the disclosure.
Figure 7B:
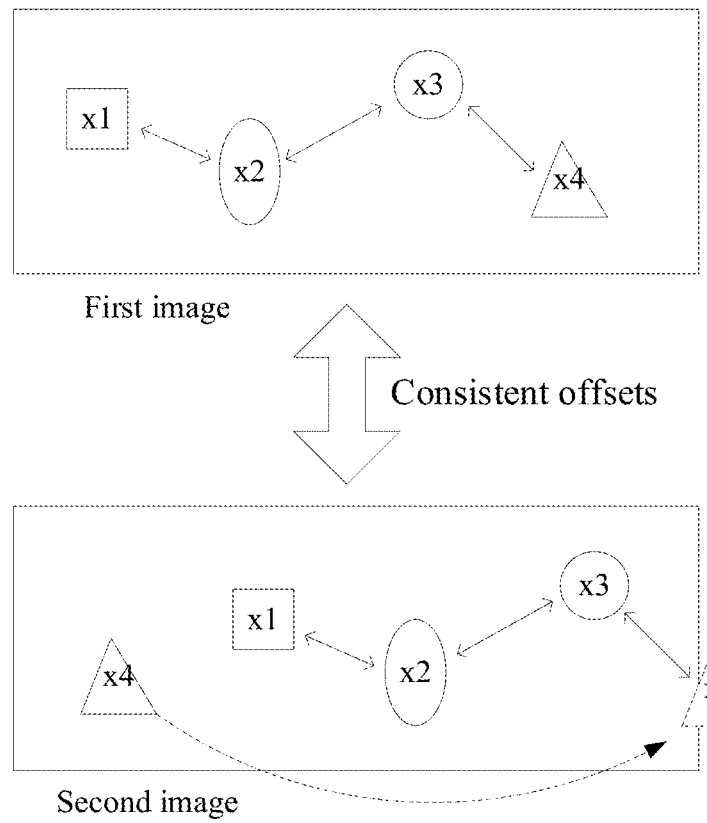

For example, there are target objects in the first image that are consistent with those in the second image, and the positions of the image sub-areas where these consistent target objects are located in the first image are the same as those in the second image. FIGS. 7A and 7B are schematic diagram of matching a first image with a second image consistent with the embodiments of the disclosure. As shown in FIG. 7A, the first image information matches with the second image information in response to satisfying the following conditions: the second image includes target object x1, target object x2, target object x3, and target object x4, while the first image also includes the target object x1, the target object x2, the target object x3, and the target object x4, and the respective position codes of the target object x1, the target object x2, the target object x3, and the target object x4 in the first image and the second image are completely consistent, That is, the image sub-areas where the target object x1, the target object x2, the target object x3, and the target object x4 are located in the first image are completely consistent with the image sub-areas where the target object x1, the target object x2, the target object x3, and the target object x4 are located in the second image.

In some embodiments, the first image information matches to the second image information in response to the first image information including two pieces of target object information with the object code same as the object code of two pieces of target object information included in the second image information, and a position code offset of the two pieces of target object information included in the first image information being consistent with a position code offset of the two pieces of target object information included in the second image information.

That is, the first image includes at least two target objects in the second image, and the relative positions of the at least two target objects are consistent. The first position corresponding to the first image and the second position corresponding to the second position are a same position or a similar position. The only difference is that a relative position between the first sub-image in the first image and the second sub-image in the second image is shifted, that is, an initial shooting direction when the first image is captured at the first position is different from an initial shooting direction when the second image is captured at the second position. As shown in FIG. 7B, the first image information matches with the second image information in response to satisfying the following conditions: the second image includes target object x1, target object x2, target object x3, and target object x4, while the first image also includes the target object x1, target object x2, target object x3, and target object x4, and the position code offsets of the target object x1, the target object x2, the target object x3, and the target object x4 in the first image and the second image are respectively consistent, that is, the image sub-areas where the target object x1, target object x2, target object x3, and target object x4 are located in the first image correspond one-to-one to the image sub-areas where the target object x1, target object x2, target object x3, and target object x4 are located in the the second image.

In some embodiments, obtaining the position information of the first position according to the position information corresponding to the target information in process 104 may be implemented in the following manners.

In some embodiments, the position information corresponding to the target information may be determined as the position information of the first position. That is, the position information corresponding to the target information in the information set is used as the position information of the first position.

In some embodiments, the position information corresponding to the target information may be adjusted according to image offset information between the first image and the second image corresponding to the target information in the information set, to obtain the position information of the first position information. That is, an offset adjustment is performed on the position information corresponding to the target information through the image offset information between the matched first image information and the second image information, to obtain more accurate position information as the position information of the first position.

In some embodiments, there may be a plurality of pieces of second image information matching the first image, thus there may be a plurality of pieces of target information. In this scenario, among a plurality of second images corresponding to the target information in the information set, the second image with a largest similarity with the first image is selected, and then the position information corresponding to the selected second image is determined as the position information of the first position. That is, after an initial positioning is realized according to the comparison of the image information, the position information obtained by the initial positioning is screened using the image similarity, and the position information with the largest image similarity, that is, a closest position is taken as the position information of the first position.

In some embodiments, the information set for the target area can be pre-configured, and a plurality of positions in the target area can be determined by the following processes.

First, the target area is scanned to establish a spatial coordinate system corresponding to the target area. Then, a plurality of positions in the target area are determined based on the spatial coordinate system, thereby obtaining the position information of the plurality of positions, such as relative coordinate information of the plurality of positions in the spatial coordinate system. The position information and the second image information of the second image captured from the plurality of positions respectively, constitute the information set, to facilitate subsequent positioning.

Figure 8:
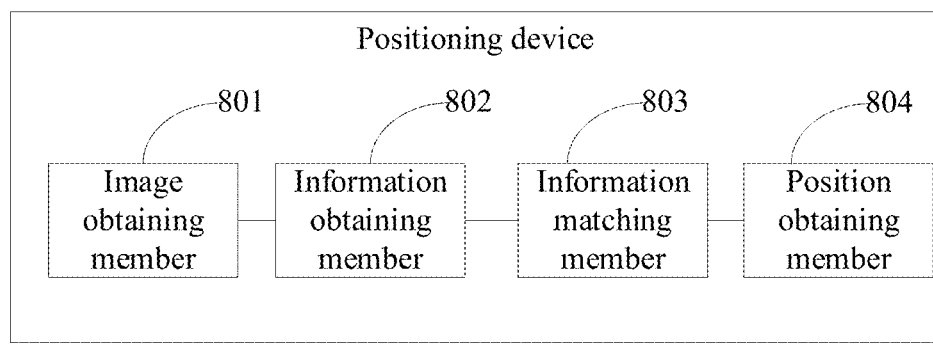
FIG. 8 is a schematic structural diagram of a positioning device consistent with the embodiments of the disclosure.

FIG. 8 is a schematic structural diagram of a positioning device consistent with the embodiments of the disclosure. The positioning device can be configured in an electronic device capable of image processing, such as a mobile phone, a tablet computer, etc. The technical solution is mainly used to improve the reliability of positioning the electronic device.

As shown in FIG. 8, the positioning device includes an image obtaining member 801, an information obtaining member 802, an information matching member 803, and a position obtaining member 804.

The image obtaining member 801 is configured to obtain a first image at a first position. The first image is an image captured at the first position, and the first position is any position within the target area.

The information obtaining member 802 is configured to obtain first image information from the first image.

The information matching member 803 is configured to match the first image information with the second image in an information set to obtain target information corresponding to the first image. The information set includes a plurality of pieces of position information of a plurality of positions within the target area and the second image information respectively corresponding to each of the plurality of pieces of position information. The second image information is obtained based on a second image. The second image is captured from the plurality of positions respectively within the target area.

The position obtaining member 804 is configured to obtain position information of the first position according to the position information corresponding to the target information.

In some embodiments, the information set is pre-configured for the plurality of positions in the target area, and the information set includes the position information of the plurality of positions in the target area and the second image information corresponding each of the plurality of positions. After the first image at the first position to be positioned is obtained, the target information corresponding to the first image can be obtained by matching the first image information of the first image with the second image information in the information set, so that the position information of the first position can be obtained according to the position information corresponding to the target information in the information set. Therefore, the positioning is realized through the comparison of image information, rather than relying on satellite signal positioning, thereby avoiding the situation that the satellite signal is poor and cannot be positioned, and improving the reliability of positioning.

In some embodiments, the first image includes a plurality of first sub-images, and the first image information includes shooting direction information corresponding to each of the plurality of first sub-images.

The information matching member 803 is specifically configured to match the first image information with the second image information in the information set according to the shooting direction information.

In some embodiments, the second image includes a plurality of second sub-images, and the second image information includes shooting direction information corresponding to each of the plurality of second sub-images.

Before the information matching member 803 matches the first image information with the second image information in the information set according to the shooting direction information, the information matching member 803 is further configured to determine that one of the plurality of first sub-images matches with one of the plurality of second sub-images, and the one of the plurality of first sub-images has an shooting direction deviation with the one of the plurality of second sub-images, and adjust the shooting direction information corresponding to each of the plurality of first sub-images based on the shooting direction deviation.

In some embodiments, the information obtaining member 802 is specifically configured to identify at least one target object included in the first image, and determine the first image information according to target object information of the target object. The target object information is used for matching the first image information and the second image information.

In some embodiments, an image area of the first image includes a plurality of image sub-areas, and the plurality of image sub-areas are obtained by dividing the image area of the first image.

The target object information includes an object code and a position code, the object code characterizes a type of the target object, and the position code characterizes one of the plurality of sub-areas of the first image that the target object is located in.

In some embodiments, the first image information matches to the second image information in response to at least one of: the first image information including the target object information with an object code and position code same as an object code and position code of the target object information included in the second image information; or the first image information including two pieces of target object information with the object code same as the object code of two pieces of target object information included in the second image information, and a position code offset of the two pieces of target object information included in the first image information being consistent with a position code offset of the two pieces of target object information included in the second image information.

In some embodiments, the position obtaining member 804 is specifically configured to determine the position information corresponding to the target information as the position information of the first position; or, adjust the position information corresponding to the target information according to image offset information between the first image and the second image corresponding to the target information in the information set, to obtain the position information of the first position; or, among a plurality of second images corresponding to the target information in the information, select the second image with a largest similarity with the first image, and determine the position information corresponding to the second image as the position information of the first position.

Figure 9:
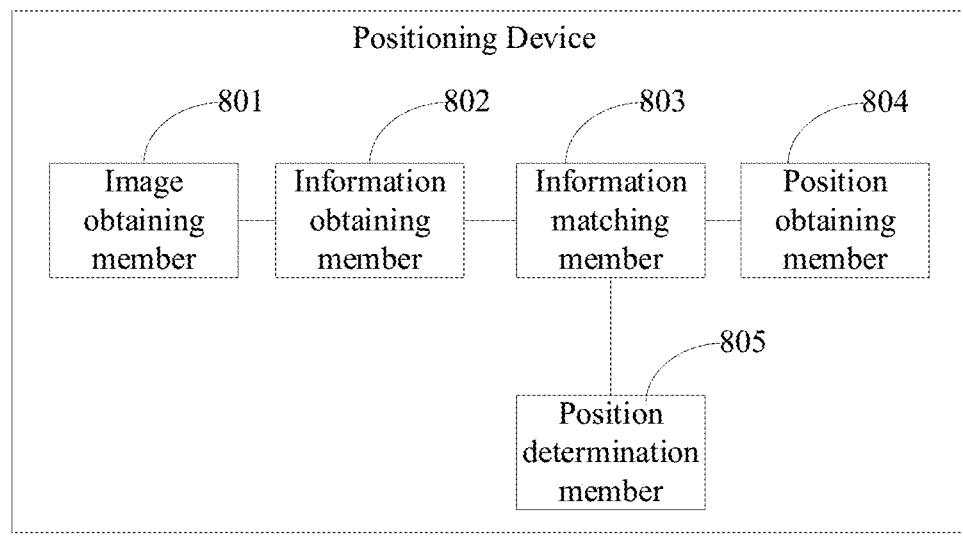
FIG. 9 is another schematic structural diagram of a positioning device consistent with the embodiments of the disclosure.

FIG. 9 is another schematic structural diagram of a positioning device consistent with the embodiments of the disclosure. As shown in FIG. 9, the positioning device further includes a position determination member 805. The position determination member 805 is configured to scan the target area and establish a spatial coordinate system corresponding to the target area, and determine a plurality of positions in the target area based on the spatial coordinate system. The plurality of positions are used to constitute the information set.

For the description of each member in FIG. 9, reference may be made to the description of the positioning device shown in FIG. 8, which is omitted here.

Figure 10:
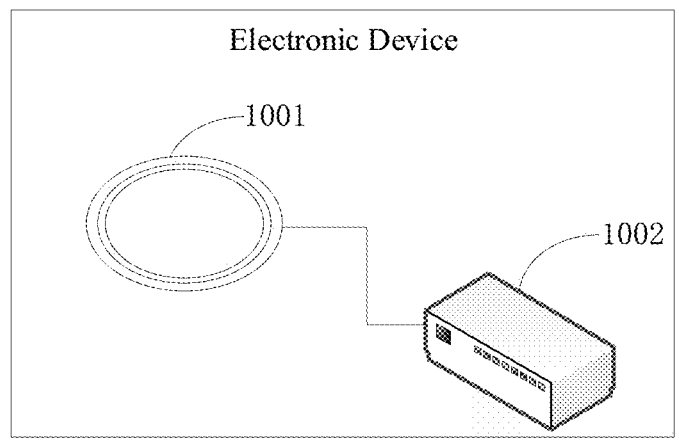
FIG. 10 is a schematic structural diagram of an electronic device consistent with the embodiments of the disclosure.

FIG. 10 is a schematic structural diagram of an electronic device consistent with the embodiments of the disclosure. The electronic device may be an electronic device capable of image processing, such as a mobile phone, a tablet computer, etc. The technical solution is mainly used to improve the reliability of positioning the electronic device.

As shown in FIG. 10, the electronic device includes an image acquisition device 1001 configured to shoot images, and a processor 1002 configured to execute a computer program stored in a memory to: obtain a first image at a first position, obtain first image information from the first image, match the first image information with second image information in an information set to obtain target information corresponding to the first image, and obtain position information of the first position based on one of the plurality of pieces of position information that corresponds to the target information. The first image includes an image captured at the first position. The first position is a position within a target area. The information set includes the plurality of pieces of position information of a plurality of positions within the target area and the second image information respectively corresponding to each of the plurality of pieces of position information. The second image information is obtained based on a second image. The second image is captured from the plurality of positions respectively within the target area.

In some embodiments, the information set is pre-configured for the plurality of positions in the target area, and the information set includes the position information of the plurality of positions in the target area and the second image information corresponding each of the plurality of positions. After the first image at the first position to be positioned is obtained, the target information corresponding to the first image can be obtained by matching the first image information of the first image with the second image information in the information set, so that the position information of the first position can be obtained according to the position information corresponding to the target information in the information set. Therefore, the positioning is realized through the comparison of image information, rather than relying on satellite signal positioning, thereby avoiding the situation that the satellite signal is poor and cannot be positioned, and improving the reliability of positioning.

Taking a scenario where a mobile phone carried by a user needs to be positioned in a street as an example, a prerequisite of the technical solution of the present disclosure is that there are many identifiable image feature points in all directions in the space where the electronic device such as the mobile phone is located. The main theoretical basis is that at any point in a space, the images captured by a camera are unique. In a case of a same environment, as long as a same image is found through comparison, the current position can be considered as the last position. The images in close positions change little, and the images in distant positions change greatly.

The technical solution of the present disclosure is divided into two parts. First, all reachable position points are traversed through a preset method, such as laser, and all images and position information of the current point are recorded, thereby obtaining the information set. Secondly, the image of the current position point is obtained and compared with the previously collected images (that is, the information set), and then is converted to the current position. In view of the above, to obtain the position information of the mobile phone, the camera may include a 360-degree camera.

The specific implementation process is as follows.

Figure 11:
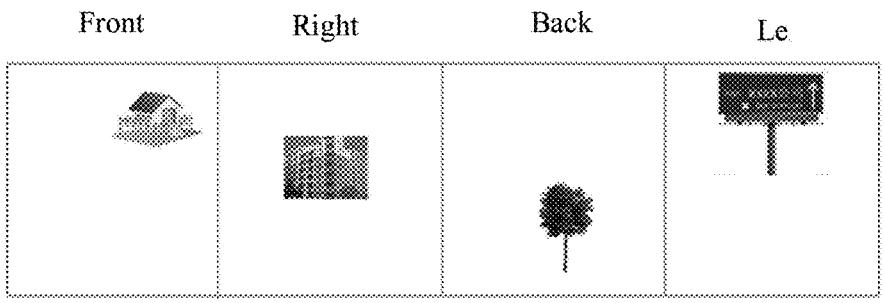
FIGS. 11-13 are schematic diagrams of example application scenarios of street positioning consistent with the embodiments of the disclosure.

First, at a preprocessing phase: the coordinates of the current position in the environment (i.e., the target area) is determined by a preset method (such as laser technology), and a 360-degree image of each position is captured. Specifically, a plurality of images can be stitched into one image. For example, four cameras on a front, back, left, and right sides of the device can be stitched into one image. For example, as shown in FIG. 11, four images at the current positions of front, back, left, and right are collected to form a panoramic image.

Figure 12:
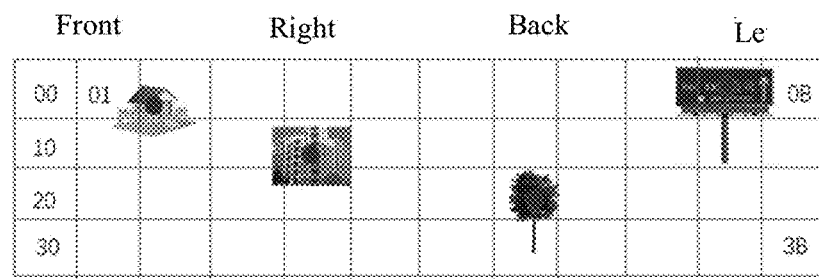
Figure 13:
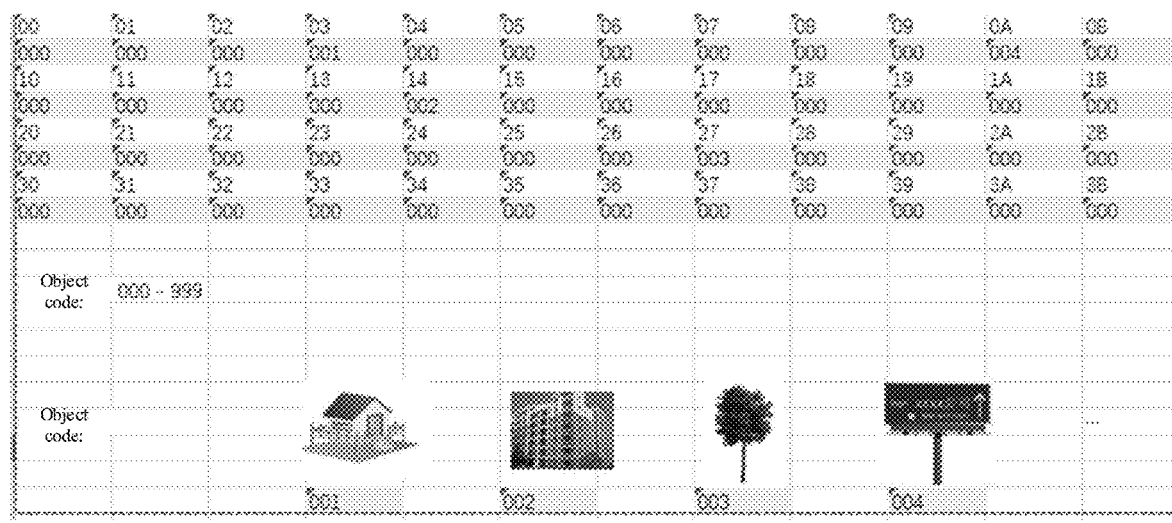

Based on the above, AI processing is performed on the panoramic image collected at each position to identify whether there is a specific object in the image. The object can be set in advance, for example, N objects can be selected as valid objects in the entire scene. As shown in FIG. 11, houses, buildings, trees, and billboards are part of the N objects. Secondly, the image is divided, and each part of the image has a code, so that a center of the recognized object is in a specific code area, and thus each image can be coded twice. The encoded character strings can be represented as shown in FIGS. 12 and 13. Therefore, after the previous processes, address physical coordinates (X, Y) of each position are indirectly associated with a set of character strings, for example, 000 000 000 001 000 . . . , connect the values from 00 to 3B to create a searchable table, that is, the information set.

Therefore, based on the established information set, after an image is captured at the current position, AI recognition is performed to obtain a set of codes for the current position. By querying the set of codes in the table generated above, the physical coordinate represented by the current position can be obtained. Then the position information and direction information at the current moment can be obtained.

It should be noted that the information can be encoded using the method mentioned above to connect all the object codes and position codes obtained from the position. The string may be relatively long. Another encoding method can also be used is a combination of "address: valid object code" and "address: valid object code." For example, a house has an object code 001 and a position code 03, a building has an object code 002 and a position code 14, a tree has an object code 003 and a position code 37, and a billboard has an object code 004 and a position code 0A. Thus, the code of the image can be 03001, 0A004, 14004, 27003.

It should also be noted that when matching encoded strings, it is not necessary to match the strings exactly. All identifiable objects can be sorted in advance according to specific rules (ascending order), to increase the querying speed.

It should also be noted that it is not a complete match of the same position string to be considered as a successful match. In fact, as long as there are at least two adjacent faces in the four directions that match at least one object on each face, the position can be determined, that is, a successful match. Because of the different precision settings, there may be more than one matching result in the table (similar positions indicate that the strings are also very close), then the image matching algorithm can be further used to find the one with a largest image similarity, and the result can be corrected again using the image algorithm.

In some embodiments, when identifying objects through AI, it is not necessary to distinguish N objects at once, but only recognize objects that may appear in the surrounding area.

The disclosed systems, apparatuses, and methods may be implemented in other manners not described here. For example, the devices described above are merely illustrative. For example, the division of members may only be a logical function division, and there may be other ways of dividing the members. For example, a plurality of members or members may be combined or may be integrated into another system, or some features may be ignored, or not executed. Further, the coupling or direct coupling or communication connection shown or discussed may include a direct connection or an indirect connection or communication connection through one or more interfaces, devices, or members, which may be electrical, mechanical, or in other form.

The members described as separate members may or may not be physically separate, and a member shown as a member may or may not be a physical member. That is, the members may be located in one place or may be distributed over a plurality of network elements. Some or all of the members may be selected according to the actual needs to achieve the object of the present disclosure.

In addition, the functional members in the various embodiments of the present disclosure may be integrated in one processing member, or each member may be an individual physically member, or two or more members may be integrated in one member.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the application being indicated by the following claims.

What is claimed is:

1. A positioning method comprising:
   obtaining a first image at a first position, the first image including an image captured by an image acquisition device at the first position, and the first position where the image acquisition device is located for capturing the first image being a position within a target area;
   obtaining first image information from the first image;
   matching the first image information with second image information in an information set to obtain target information corresponding to the first image, the information set including a plurality of pieces of position information of a plurality of positions within the target area and the second image information respectively corresponding to each of the plurality of pieces of position information, the second image information being obtained based on a second image, and the second image being captured at the plurality of positions respectively within the target area; and
   obtaining position information of the first position where the image acquisition device is located for capturing the first image, based on one of the plurality of pieces of position information that corresponds to the target information.

2. The method of claim 1, wherein:
   the first image includes a plurality of first sub-images, and the first image information includes shooting direction information corresponding to each of the plurality of first sub-images; and
   matching the first image information with the second image information in the information set includes:
      matching the first image information with the second image information in the information set according to the shooting direction information.

3. The method of claim 2, wherein:
   the second image includes a plurality of second sub-images, and the second image information includes shooting direction information corresponding to each of the plurality of second sub-images; and
   the method further comprises, before matching the first image information with the second image information in the information set according to the shooting direction information:
      determining that one of the plurality of first sub-images matches with one of the plurality of second sub-images, and the one of the plurality of first sub-images has a shooting direction deviation with the one of the plurality of second sub-images; and
      adjusting the shooting direction information corresponding to each of the plurality of first sub-images based on the shooting direction deviation.

4. The method of claim 1, wherein obtaining the first image information from the first image includes:
   identifying a target object included in the first image; and
   determining the first image information according to target object information of the target object, the target object information being used for matching the first image information and the second image information.

5. The method of claim 4, wherein:
   an image area of the first image includes a plurality of image sub-areas, and the plurality of image sub-areas are obtained by dividing the image area of the first image; and
   the target object information includes an object code and a position code, the object code characterizing a type of the target object, and the position code characterizing one of the plurality of sub-areas of the first image that the target object is located in.

6. The method of claim 5, wherein the first image information matches to the second image information in response to at least one of:
   the first image information including the target object information with an object code and position code same as an object code and position code of the target object information included in the second image information; or
   the first image information including two pieces of target object information with the object code same as the object code of two pieces of target object information included in the second image information, and a position code offset of the two pieces of target object information included in the first image information being consistent with a position code offset of the two pieces of target object information included in the second image information.

7. The method of claim 1, wherein obtaining the position information of the first position based on the one of the plurality of pieces of position information that corresponds to the target information includes at least one of:
   determining the one of the plurality of pieces of position information that corresponds to the target information as the position information of the first position;
   adjusting the one of the plurality of pieces of position information that corresponds to the target information according to image offset information between the first image and the second image corresponding to the target information in the information set, to obtain the position information of the first position; or
   among a plurality of second images corresponding to the target information in the information set, selecting the second image with a largest similarity with the first image, and determining the position information corresponding to the second image as the position information of the first position.

8. The method of claim 1, further comprising:
   scanning the target area to establish a spatial coordinate system corresponding to the target area; and
   determining the plurality of positions within the target area based on the spatial coordinate system.

9. An electronic device comprising:
   an image acquisition device for capturing images;
   a memory storing a computer program; and
   a processor configured to execute the computer program to:

obtain a first image at a first position, the first image including an image captured by the image acquisition device at the first position, and the first position where the image acquisition device is located for capturing the first image being a position within a target area;

obtain first image information from the first image;

match the first image information with second image information in an information set to obtain target information corresponding to the first image, the information set including a plurality of pieces of position information of a plurality of positions within the target area and the second image information respectively corresponding to each of the plurality of pieces of position information, the second image information being obtained based on a second image, and the second image being captured at the plurality of positions respectively within the target area; and obtain position information of the first position where the image acquisition device is located for capturing the first image, based on one of the plurality of pieces of position information that corresponds to the target information.

10. The electronic device of claim 9, wherein:

the first image includes a plurality of first sub-images, and the first image information includes shooting direction information corresponding to each of the plurality of first sub-images; and the processor is further configured to execute the computer program to:

match the first image information with the second image information in the information set according to the shooting direction information.

11. The electronic device of claim 10, wherein:

the second image includes a plurality of second sub-images, and the second image information includes shooting direction information corresponding to each of the plurality of second sub-images; and the processor is further configured to execute the computer program to, before matching the first image information with the second image information in the information set according to the shooting direction information:

determine that one of the plurality of first sub-images matches with one of the plurality of second sub-images, and the one of the plurality of first sub-images has an shooting direction deviation with the one of the plurality of second sub-images; and adjust the shooting direction information corresponding to each of the plurality of first sub-images based on the shooting direction deviation.

12. The electronic device of claim 9, wherein the processor is further configured to execute the computer program to:

identify a target object included in the first image; and determine the first image information according to target object information of the target object, the target object information being used for matching the first image information and the second image information.

13. The electronic device of claim 12, wherein:

an image area of the first image includes a plurality of image sub-areas, and the plurality of image sub-areas are obtained by dividing the image area of the first image; and the target object information includes an object code and a position code, the object code characterizing a type of the target object, and the position code characterizing one of the plurality of sub-areas of the first image that the target object is located in.

14. The electronic device of claim 13, wherein the first image information matches to the second image information in response to at least one of:

the first image information including the target object information with an object code and position code same as an object code and position code of the target object information included in the second image information; or the first image information including two pieces of target object information with the object code same as the object code of two pieces of target object information included in the second image information, and a position code offset of the two pieces of target object information included in the first image information being consistent with a position code offset of the two pieces of target object information included in the second image information.

15. The electronic device of claim 9, wherein the processor is further configured to execute the computer program to perform at least one of:

determining the one of the plurality of pieces of position information that corresponds to the target information as the position information of the first position;

adjusting the one of the plurality of pieces of position information that corresponds to the target information according to image offset information between the first image and the second image corresponding to the target information in the information set, to obtain the position information of the first position; or among a plurality of second images corresponding to the target information in the information set, selecting the second image with a largest similarity with the first image, and determining the position information corresponding to the second image as the position information of the first position.

16. The electronic device of claim 9, wherein the processor is further configured to execute the computer program to:

scan the target area to establish a spatial coordinate system corresponding to the target area; and determine the plurality of positions within the target area based on the spatial coordinate system.

17. A non-transitory computer readable storage medium containing a computer program that, when being executed, causes at least one processor to perform:

obtaining a first image at a first position, the first image including an image captured by an image acquisition device at the first position, and the first position where the image acquisition device is located for capturing the first image being a position within a target area;

obtaining first image information from the first image;

matching the first image information with second image information in an information set to obtain target information corresponding to the first image, the information set including a plurality of pieces of position information of a plurality of positions within the target area and the second image information respectively corresponding to each of the plurality of pieces of position information, the second image information being obtained based on a second image, and the second image being captured at the plurality of positions respectively within the target area; and obtaining position information of the first position where the image acquisition device is located for capturing the first image, based on one of the plurality of pieces of position information that corresponds to the target information.

18. The storage medium of claim 17, wherein:
the first image includes a plurality of first sub-images, and the first image information includes shooting direction information corresponding to each of the plurality of first sub-images; and
the at least one processor is further configured to perform:
matching the first image information with the second image information in the information set according to the shooting direction information.

19. The storage medium of claim 18, wherein:
the second image includes a plurality of second sub-images, and the second image information includes shooting direction information corresponding to each of the plurality of second sub-images; and
the at least one processor is further configured to perform:
determining that one of the plurality of first sub-images matches with one of the plurality of second sub-images, and the one of the plurality of first sub-images has a shooting direction deviation with the one of the plurality of second sub-images; and
adjusting the shooting direction information corresponding to each of the plurality of first sub-images based on the shooting direction deviation.

20. The storage medium of claim 17, wherein the at least one processor is further configured to perform:
identifying a target object included in the first image; and
determining the first image information according to target object information of the target object, the target object information being used for matching the first image information and the second image information.

* * * * *